(12) United States Patent
Tanabe

(10) Patent No.: US 9,685,901 B2
(45) Date of Patent: Jun. 20, 2017

(54) MOTOR CONTROLLER WITH FLEXIBLE PROTECTION MODES

(71) Applicant: SEMICONDUCTOR COMPONENTS INDUSTRIES, LLC, Phoenix, AZ (US)

(72) Inventor: Masashi Tanabe, Ota (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 14/875,884

(22) Filed: Oct. 6, 2015

(65) Prior Publication Data

US 2016/0365822 A1    Dec. 15, 2016

Related U.S. Application Data

(60) Provisional application No. 62/174,768, filed on Jun. 12, 2015.

(51) Int. Cl.
*H02P 1/00* (2006.01)
*H02P 29/02* (2016.01)

(52) U.S. Cl.
CPC ............ *H02P 29/022* (2013.01); *H02P 29/02* (2013.01)

(58) Field of Classification Search
CPC ...................................... G04C 23/00
USPC .......................... 318/452, 445, 34
See application file for complete search history.

(56) References Cited

U.S. PATENT DOCUMENTS

| 5,764,020 A | * | 6/1998 | Maiocchi | H02P 6/00 318/400.11 |
| 7,042,180 B2 | * | 5/2006 | Terry | F04B 35/04 318/400.21 |
| 8,975,845 B2 | * | 3/2015 | Guzelgunler | H02P 29/02 318/400.22 |

FOREIGN PATENT DOCUMENTS

| JP | H10-213523 A | 8/1998 |
| JP | 2011-078228 A | 4/2011 |

* cited by examiner

*Primary Examiner* — David S Luo
(74) *Attorney, Agent, or Firm* — Polansky & Associates, P.L.L.C.; Paul J. Polansky

(57) ABSTRACT

A motor controller for use in a motor system includes a mode select circuit, a fault detection circuit, a protection logic circuit, and a motor control circuit. The mode select circuit sets the motor controller in one of an internal protection mode and an external protection mode. The fault detection circuit detects whether the motor system is operating in a normal operation state or a fault state. If the motor system is operating in the fault state, the protection logic circuit outputs a protection signal in the internal protection mode, and keeps the protection signal inactive while activating an external diagnostic signal in the external protection mode. The motor control circuit controls a motor of the motor system in response to a speed control signal when the protection signal is inactive, and in response to the protection signal when the protection signal is active.

24 Claims, 3 Drawing Sheets

MOTOR CONTROLLER WITH FLEXIBLE PROTECTION MODES

This application claims priority to U.S. Provisional Application No. 62/174,768, filed on Jun. 12, 2015, entitled "Motor Controller with Flexible Protection Modes," invented by Masashi Tanabe.

FIELD OF THE DISCLOSURE

The present disclosure relates generally to motor circuits, and more particularly to controllers for motors such as brushless DC motors with fault protection capabilities.

BACKGROUND

Electric motors are used in a wide variety of consumer and industrial products ranging from small, low-cost products to high-end products. Low cost products need an electronic motor controller that is inexpensive and requires only a small number of external components. High-end products, on the other hand, need more sophisticated motor control algorithms. The sophisticated motor control algorithms can be implemented by an upper control unit which provides commands to an integrated circuit (IC) motor controller. The upper control unit is typically implemented by a microcontroller (MCU) with on-chip memory containing software to direct the IC motor controller to perform precise motor speed and commutation actions.

In automotive environments, electric motors are used for several different applications including radiator fans, fuel pumps, water pumps, and oil pumps. In these environments it is important to provide several protection mechanisms to protect against fault conditions that could lead to safety hazards. However it has been especially difficult to design a single IC motor controller that is useful for most or all of these different applications.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
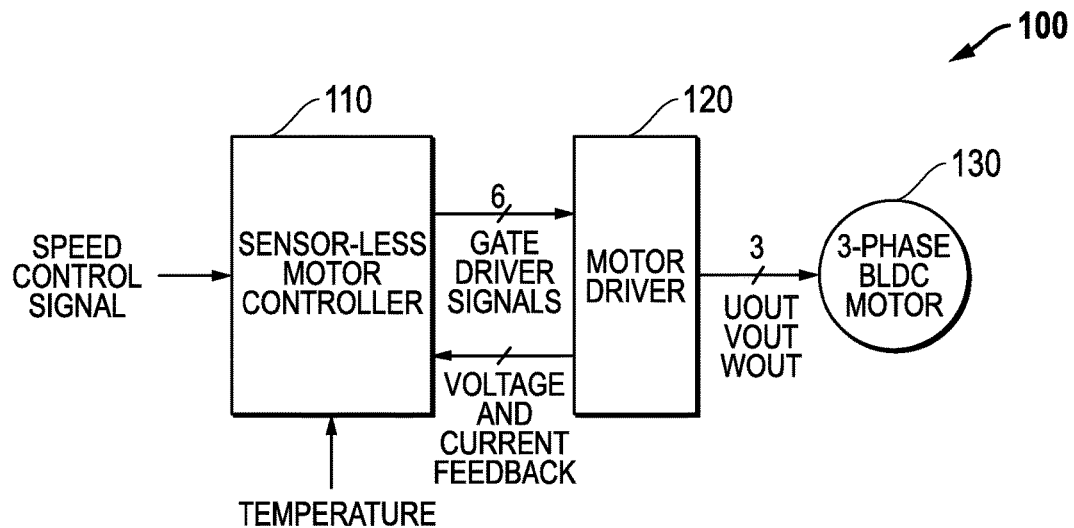
FIG. 1 illustrates in block diagram form a stand-alone motor system according to one embodiment of the present invention.

FIG. 1 illustrates in block diagram form a stand-alone motor system 100 according to one embodiment of the present invention. Motor system 100 includes generally a sensor-less motor controller 110, a motor driver 120, and a 3-phase brushless direct current (BLDC) motor 130. Motor controller 110 has a first input for receiving a control signal labeled "SPEED CONTROL SIGNAL", a second input for receiving a temperature signal labeled "TEMPERATURE", a third input for receiving feedback signals labeled "VOLTAGE AND CURRENT FEEDBACK", and an output for providing a set of six control signals labeled "GATE DRIVER SIGNALS". Motor driver 120 has inputs for receiving the GATE DRIVER SIGNALS, a first set of outputs for providing the VOLTAGE AND CURRENT FEEDBACK signals, and a second set of outputs for providing three motor phase drive signals labeled "UOUT", "VOUT", and "WOUT" to corresponding each of the three phases of motor 130.

In operation, motor controller 110 provides six gate drive signals to motor driver 120 to control the source drive and sink drive of each phase of motor 130. Motor controller 110 controls the speed of motor 130 to the speed set by the SPEED CONTROL SIGNAL. In one embodiment, the SPEED CONTROL SIGNAL is a pulse train whose pulse width indicates the desired rotation speed of motor 130. In motor system 100, the SPEED CONTROL SIGNAL is generated by a discrete clock source, not shown in FIG. 1. Motor controller 110 is sensor-less because it does not use sensors such as brushes and Hall-effect sensors to measure the rotor position to determine when to commutate the phases. Rather it determines when to commutate the phases by sensing the back electromotive force (EMF) of each motor phase drive signal during its inactive times.

Motor driver 120 includes six switches corresponding to the source and sink drive portions of the three phases. In one form, the switches are N-channel power metal-oxide-semiconductor field effect transistor (MOSFETs), which are capable of driving the large load inductance of each motor phase. In other embodiments, other suitable transistor types may be used. Motor controller 110 is implemented as a single monolithic IC, and motor driver 120 is external to this IC. Thus motor controller 110 can operate with different transistors sized appropriately for their respective target motors. In one embodiment, motor driver 120 is implemented with discrete MOSFETs with discrete sense and protection resistors, but in other embodiments, these components can be combined in various combinations of hybrid packages.

Motor controller 110 is designed for operation in automotive environments, and includes various protection mechanisms that protect it and motor system 100 from various fault conditions that may occur. These fault conditions include such things as over-current, under-voltage, over-voltage, motor driver short circuit, over-temperature, locked rotor, and control input errors. Depending on the type of fault, motor controller 110 is programmable to take an appropriate action that will be different for different applications.

In particular, motor controller 110 includes circuitry that performs appropriate actions in response to a fault condition and provides programmable operation for both stand-alone systems (like motor system 100) and systems with an upper control unit. As will be seen in further detail below, it does so by selectively and programmably allowing either the upper control unit to dictate an appropriate action, or motor controller 110 to determine an action itself, in response to a fault condition.

Figure 2:
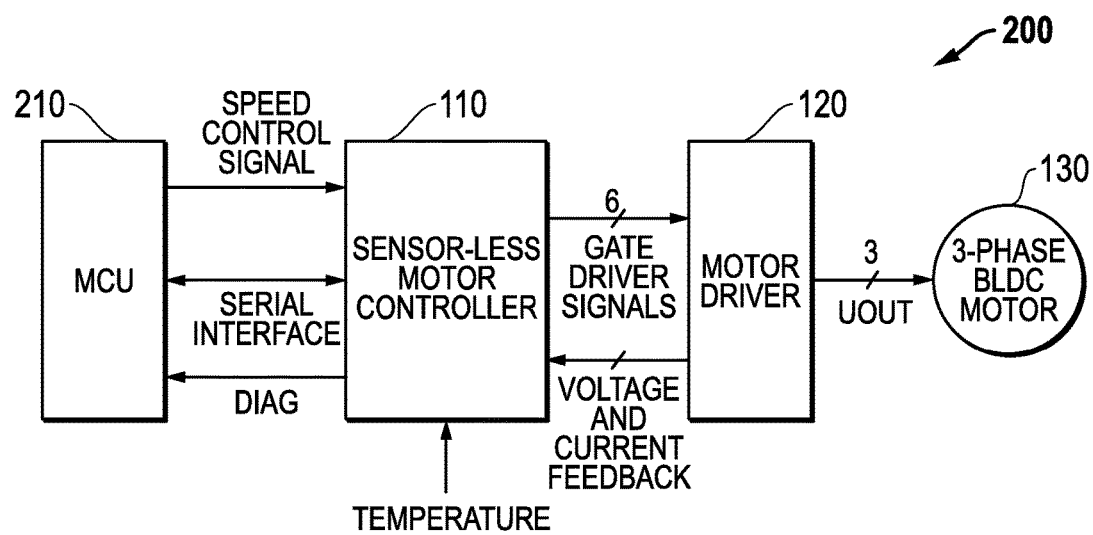
FIG. 2 illustrates in block diagram form a microcontroller-based motor system according to another embodiment of the present invention.

FIG. 2 illustrates in block diagram form a microcontroller-based motor system 200 according to another embodiment of the present invention. Motor system 200 includes the same motor controller 110, motor driver 120, and 3-phase BLDC motor 130 as previously illustrated with respect to FIG. 1. However motor system 200 further includes an MCU 210 that operates as an upper control unit to control motor controller 110 and to provide the SPEED CONTROL SIGNAL.

In addition, motor system 200 illustrates two additional interfaces of motor controller 110 that were not used in motor system 100. First, motor controller 110 programmably provides a diagnostic output signal labeled "DIAG" to MCU 210 to indicate the occurrence of a fault condition. In response to the DIAG signal, MCU 210 can take actions it deems appropriate in response to the particular fault using sophisticated motor control algorithms controlled by software.

Second, motor controller 110 has a serial interface that allows MCU 210 to communicate with and control motor controller 110. In one particular embodiment, the serial interface conforms to the industry-standard serial peripheral interface (SPI) protocol. According to this protocol, MCU 210 operates as a SPI master, and motor controller 110 operates as a SPI slave. Having this interface provides two capabilities related to fault protection. First, it allows MCU 210 to program various settings into motor controller 110, including settings that govern the actions that motor controller 110 takes when particular fault conditions occur. Second, it allows MCU 210 to read diagnostic registers inside motor controller 110 so that MCU 210 can re-program certain settings or determine a new value for the SPEED CONTROL SIGNAL based on the actual fault.

Figure 3:
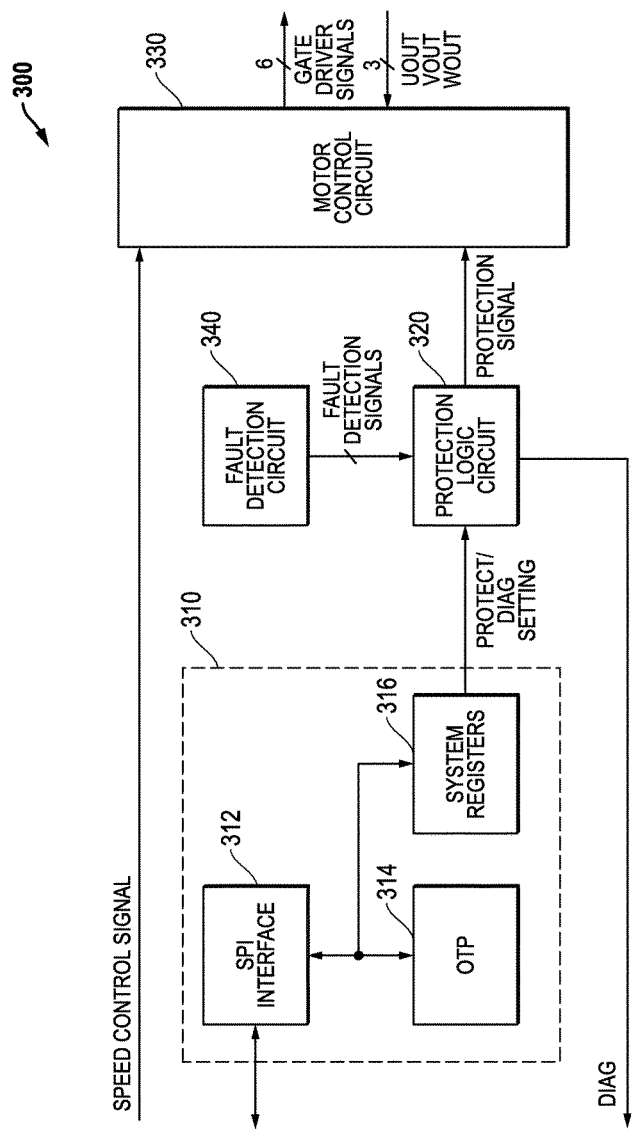
FIG. 3 illustrates in block diagram form a motor controller that may be used as the motor controller of FIGS. 1 and 2.

FIG. 3 illustrates in block diagram form a motor controller 300 that may be used as motor controller 110 of FIGS. 1 and 2. Motor controller 300 includes generally a mode select circuit 310, a protection logic circuit 320, a motor control circuit 330, and a fault detection circuit 340.

Mode select circuit 310 includes a SPI interface 312, a one-time programmable (OTP) memory 314, and a set of system registers 316. SPI interface 312 has a first bidirectional port for connection to an external SPI master, such as MCU 210, and a second bidirectional port. OTP 314 is connected to the second bidirectional port of SPI interface 312, and has an output. System registers 316 are connected to the second bidirectional port of SPI interface 312, and have an input connected to the output of OTP 314 and an output for providing a signal labeled "PROTECT/DIAG SETTING".

Protection logic circuit 320 has an input for receiving the PROTECT/DIAG SETTING signal, a set of inputs for receiving fault signals labeled "FAULT DETECTION SIGNALS", a first output for providing a signal labeled "PROTECTION SIGNAL", and a second output for providing the DIAG signal.

Fault detection circuit 340 provides the FAULT DETECTION SIGNALS that indicate whether the motor system is operating in a normal operation state or a fault state.

Motor control circuit 330 has a first input for receiving the SPEED CONTROL SIGNAL, a second input for receiving the PROTECTION SIGNAL, a third input for receiving motor phase signals UOUT, VOUT, and WOUT, and an output for providing the GATE DRIVER SIGNALS.

In operation, motor control circuit 330 drives the gates of external transistors, which in turn provide motor phase signals to each phase of motor 130. In BLDC motor control, one motor phase signal is driven as the source, one motor phase signal is driven as the sink, and one motor phase signal is not driven in a well-known alternating pattern to cause rotation of the motor. Each time the rotor rotates 120°, motor control circuit 330 commutates the motor. Motor control circuit 330 determines the phase of motor 130 by repeatedly sensing back EMF on the undriven phase.

On startup, motor control circuit 330 ramps up the speed of the motor at a programmable rate and the motor eventually reaches the desired speed. Motor control circuit 330 has two ways of setting the target speed when speed control is enabled. First for stand-alone systems, a low frequency PWM can provide a SPEED CONTROL SIGNAL having a duty cycle that selects a corresponding one of a set of Speed Select Registers. The target speed is then determined by the value programmed into the selected Speed Select Register. Second for systems with an upper control unit, the upper control unit can provide the SPEED CONTROL SIGNAL with a fixed duty cycle to select one of the Speed Select Registers, and the upper control unit can then also write the target speed directly into the corresponding Speed Select Register via SPI interface 312.

Mode select circuit 310 provides various programmable mode and setting signals to control the operation of protection logic circuit 320 and motor control circuit 330. Mode select circuit 310 includes SPI interface 312 to allow it to receive externally generated data for programming into OTP 314 or system registers 316. For example if motor controller 300 will be used in a stand-alone application, SPI interface 312 can be connected to a programmer or VLSI tester and receive data to be stored in OTP 314. If motor controller 300 will be used with an upper control unit, then the settings in OTP 314 can be programmed by a programmer or VLSI tester as in the stand alone mode, or they can be programmed in-system after being connected to the upper control unit. Since OTP 314 cannot be erased and reprogrammed, however, it is important for the user not to program any settings until they are determined to be permanent. Moreover, OTP 314 has a protection register that can be set to prevent any further writes, thereby making all the settings permanent.

When motor controller 300 is reset or otherwise starts up, such as during a sleep to standby state transition, various values programmed into registers of OTP 314 are transferred into corresponding registers of system registers 316. Thus OTP 314 contains an image of many of the values of system registers 316. These values include typical motor configuration settings such as speed and voltage range selections, motor direction (forward or reverse), soft start mode, dead time selection, and the like. Since these settings are conventional, they will not be discussed further. Note that while most of system registers 316 can be rewritten in the standby mode, some of system registers 316 can also be rewritten when motor controller 300 is in the normal mode, allowing an upper control unit to change the settings during motor operation.

OTP 314 also includes settings related to flexible protection modes that will now be described. These include, for one or more types of faults, whether motor controller 300 will operate in an internal protection mode or an external protection mode. In the internal protection mode when the corresponding fault condition is detected, the settings in OTP 314 and therefore system registers 316 determine how motor control circuit 330 will operate. In the external protection mode, protection logic circuit 320 activates the DIAG signal and relies on the upper control unit to change the SPEED CONTROL SIGNAL and possibly other settings in system registers 316 to determine how motor control circuit 330 will operate.

Protection logic circuit 320 also includes logic to recognize the activation of any of the FAULT DETECTION SIGNALS and to determine the actions to be taken in response. These actions vary based on whether motor controller 300 is in the internal protection mode or the external protection mode. In general, protection logic circuit 320 outputs the DIAG signal with a programmable polarity for all system errors and for most warnings.

Since system errors are serious conditions, they always result in the activation of the DIAG signal. Protection logic circuit 320, however, can selectively mask the PROTECTION SIGNAL on an error-by-error basis for each system error. With respect to each maskable error, an unmasked error corresponds to the internal protection mode, and a masked error corresponds to the external protection mode. Protection logic circuit 320 also has the capability to latch certain errors, in which case the motor stops, or to enter a self-recovery state, which allows operation to resume when the fault ends. The capabilities for masking and latching as well as details of the self recovery state for motor controller 300 are shown in TABLE I below, which corresponds to a readable diagnostic register known as MRDIAG0:

TABLE I

Error Register: MRDIAG0

| Bit | Error | Description | Maskable | Latchable | Self Recovery |
|---|---|---|---|---|---|
| 0 | OCPO | Overcurrent error | X | X | After 52.4 ms (typical) |
| 1 | VSLVPO | VS low-voltage protection enable | | | When voltage recovers |
| 2 | VSOVPO | VS over-voltage protection enable | X | | When voltage recovers |
| 3 | CHPLVPO | CHP low-voltage protection enable | | | When voltage recovers |
| 4 | VGLLVPO | VGL low-voltage protection enable | | | When voltage recovers |
| 5 | FSPO | FET short protection enable | X | X | After 52.4 ms (typical) |
| 6 | THPO | Over temperature protection enable | X | | When temperature recovers |
| 7 | CPO | Locked Rotor | X | X | After 8 periods |

As shown by TABLE I, motor controller 300 supports three types of system errors. The first type of system error can be neither masked nor latched. These system errors include the VSLVPO, CHPLVPO, VGLLVPO errors. These system errors always cause protection logic circuit 320 to activate the PROTECTION SIGNAL and motor control circuit 330 to perform a self-recovery operation.

The second type of system error can be masked but not latched. These system errors include the VSOVPO and THPO errors. If the system error is masked, then protection logic circuit 320 selects the external protection mode by keeping the PROTECTION SIGNAL inactive, and instead relies on the upper control unit to examine the error and determine the corrective steps, if any. If the system error is unmasked, then protection logic circuit 320 selects the internal protection mode by activating the PROTECTION SIGNAL and motor control circuit 330 enters a self recovery state.

The third type of system error can be masked and optionally latched. These system errors include the OCPO, FSPO, and CPO errors. If the system error is masked, then protection logic circuit 320 selects the external protection mode by keeping the PROTECTION SIGNAL inactive, and instead relies on the upper control unit to examine the error and determine the corrective steps, if any. If the system error is unmasked, then protection logic circuit 320 selects the internal protection mode by activating the PROTECTION SIGNAL. In the internal protection mode if the system error is unlatched, then protection logic circuit 320 performs an auto-recovery operation. If the system error is latched, however, then protection logic circuit 320 causes motor control circuit 330 to cease operation.

In other embodiments, a single control bit can select the internal protection mode or the external protection mode for all errors or for sub-groups of errors.

Warnings are less serious conditions that may result in the activation of the DIAG signal and could result in system action. The capabilities for different types of warnings and the corrective actions that motor controller 300 takes in response are shown in TABLE II below, which corresponds to a readable diagnostic register known as MRDIAG1:

TABLE II

Warning Register: MRDIAG1

| Bit | Warning | Description | DIAG | Blankable | Effect |
|---|---|---|---|---|---|
| 0 | THWPO | Junction temperature warning | X | X | The IC has exceeded the warning temperature but stays in normal operation |
| 1 | THSPO | Junction over-temperature | X | | The IC has exceeded the shutoff temperature. Drivers are shut down |
| 2 | WDTPO | Watchdog timer timeout | X | X | Driver stage continues with pre-selected duty cycle |
| 3 | STUPO | Startup operation | | | The motor is running open loop |
| 4 | SPCO | Feedback operation | | | Speed feedback control is active |
| 5 | | Internal use | | | |
| 6 | VCLVPO | VCC undervoltage | X | X | Driver stage is off |
| 7 | PWMPO | PWM input fault | X | | No PWM signal is detected. Driver stage continues with pre-selected duty cycle |

In one embodiment of motor controller 300 there are three types of warnings. The first type of warning does not cause the output of the DIAG signal. These warnings include the STUPO and SPCO warnings. The second type of warning causes the DIAG signal to be output unless it is blanked. These warnings include the THWPO, WDTPO and VCLPO warnings. This type of warning should be unmasked in the internal protection mode to allow the default self recovery operation. The third type of warning always causes the output of the DIAG signal. These warnings include the THSPO, and PWMPO warnings.

Thus motor controller 300 is suitable for use in either low-cost applications without an upper control unit or high-end applications with an upper control unit by implementing selectable internal or external protection modes. Moreover in systems with an upper control unit, the internal protection mode may still be selected for some types of errors. The internal protection mode provides a selection between a predetermined self-recovery operation and latching off the motor. The external protection mode provides the ability for the upper control unit to examine the source of the error and to take various programmable actions in response. In motor controller 300 the type of protection mode is individually selectable on an error-by-error basis for some system errors, but in another embodiment the type of protection could be selectable on a global basis for multiple system errors.

In general, system registers 316 include configuration registers to set the mode to either the internal protection mode or the external protection mode. These registers can be read from or written to in standby mode, but can only be read from in normal mode. OTP memory 314 includes shadow registers that contain default states for these registers. Mode select circuit 310 transfers the contents of these OTP registers into corresponding ones of system registers 316 at startup.

For example, a mode register known as the "MRCONF10" register enables or disables various errors and warnings as shown in TABLE III:

TABLE III

MRCONF10

| Bit | Name | Function |
|---|---|---|
| 7 | VCLVPEN | VCC undervoltage protection enable |
| 6 | CPEN | Motor lock protection enable |
| 5 | THWEN | Thermal warning output enable |
| 4 | THPEN | Thermal protection enable |
| 3 | FSPEN | FET short protection enable |
| 2 | OVPEN | Over-voltage protection enable |
| 1 | OCPEN | Over-current protection enable |
| 0 | DIAGSEL | DIAG output polarity selection:<br>0 = active low<br>1 = active high, draws pulldown current when off |

Accordingly, protection logic circuit 320 has a set of FAULT inputs to receive various FAULT DETECTION SIGNALS generated by fault detection circuit 340 and to selectively mask them based on the MRCONF10 register. If masked, they do not result in the assertion of the PROTECTION SIGNAL.

Similarly, a mode register known as the "MRCONF11" includes bits that determine whether particular errors are latched or result in an auto-recovery operation. Pertinent bits of MRCONF11 register are shown in TABLE IV below:

TABLE IV

MRCONF11

| Bit | Name | Function |
|---|---|---|
| 3 | CPLT | Motor block latch:<br>0 = Auto recover after a motor block<br>1 = Latch motor controller 300 off after a motor block |
| 2 | FSPLT | FET short latch:<br>0 = Auto recover after a FET short<br>1 = Latch motor controller 300 off after a FET short |
| 1 | OCPLT | Over-current latch:<br>0 = Auto recover after an over-current detection<br>1 = Latch motor controller 300 off after an over-current detection |
| 0 | DLTO | DIAG output mode selection:<br>0 = Trigger DIAG for any non-masked error or warning<br>1 = Trigger DIAG only for latched errors as defined by the xPLT bits |

If the motor system is operating in a fault state, protection logic circuit 320 activates the PROTECTION SIGNAL in the internal protection mode, and activates the DIAG signal while keeping the PROTECTION SIGNAL inactive in the external protection mode. The PROTECTION SIGNAL includes one or more signals whose activation indicates a fault and defines the behavior of motor control circuit 330 in response to the fault. For example in response to fault in the internal protection mode, the PROTECTION SIGNAL may indicate that motor control circuit 330 will stop the motor but enter an auto recovery state.

Thus motor controller 300 provides flexible protection modes so that it can be used in a stand-alone mode, such as for a low-cost motor system, or in a mode with an upper control unit, such as a high precision motor. Moreover, it allows for programmable control of the actions to be taken in response to a fault condition to make it suitable, for example, for a variety of automotive applications. For example in response to an over-temperature condition, it may be important to cease operation when used as an automotive fuel pump, but to continue operation when used in a fan motor.

The operation of motor controller 300 will now be described with reference to two particular examples, one which corresponds to a stand-alone motor system, and another which corresponds to an MCU-based motor system in which the MCU acts as an upper control unit.

EXAMPLE 1

Stand Alone Operation

Example 1 corresponds to a stand-alone system, which is a system without an upper control unit such as motor system 100 of FIG. 1. Examples of actions that could be taken for various fault conditions are illustrated in TABLE V below:

TABLE V

STAND ALONE EXAMPLE

| FAULT | PROTECTION OPERATION | DIAG SIGNAL |
|---|---|---|
| OVER VOLTAGE | MOTOR STOP AUTO RECOVERY | — |
| OVER TEMPERATURE | MOTOR STOP AUTO RECOVERY | — |
| OVER CURRENT | MOTOR STOP AUTO RECOVERY | — |
| INPUT ERROR | CASE-BY-CASE | — |

The speed of the motor during the normal operation state is based on the externally-supplied SPEED CONTROL SIGNAL but the response to various fault conditions is determined by the values programmed into OTP 314. In response to selected fault conditions, protection logic circuit 320 activates the DIAG signal and selectively activates the PROTECTION SIGNAL. However the DIAG signal is a don't-care since there is no upper control unit to receive it.

Over-voltage is a fault in which continued operation could cause damage to the motor. For this fault, the registers in OTP 314 are programmed to activate the PROTECTION SIGNAL by setting MRCONF10[2] to 0. The over-voltage fault indicates that the motor should be stopped but that motor control circuit 330 should enter an auto-recovery state. In the auto-recovery state, motor control circuit 330 restarts operation of the motor when the voltage that caused the over-voltage fault falls below a hysteretic voltage amount and protection logic circuit 320 deactivates the PROTECTION SIGNAL.

Over-temperature is a fault in which, in this example, continued operation could cause damage to the motor or to other components in the system. For this fault, the registers in OTP 314 are programmed to activate the PROTECTION SIGNAL by setting MRCONF10[4] to 0. The over-temperature fault indicates that the motor should be stopped but that motor control circuit 330 should enter the auto-recovery state. In the auto-recovery state, motor control circuit 330 restarts operation of the motor when the temperature that caused the over-temperature fault falls below a hysteretic temperature amount. In other examples such as fan motors, it may be important to continue operation since stopping the operation of the fan motor will worsen the overheating and thus the PROTECTION SIGNAL is maskable.

Over-current is a fault which may indicate an error in the load of the motor. For example motor driver 120 may require too much current to be able to provide enough torque to rotate at the desired speed with a certain load. For this fault, continued operation could cause damage to motor driver 120 or to other components in the system. The registers in OTP 314 are programmed to activate the PROTECTION SIGNAL by setting MRCONF10[1] to 0. The over-current fault indicates that the motor should be stopped and that motor control circuit 330 should enter the auto-recovery state. In the auto-recovery state, motor control circuit 330 restarts operation of the motor after an off time.

An input error is a fault in which the SPEED CONTROL SIGNAL is stuck at a particular logic state and so no longer indicates the desired speed. For example the SPEED CONTROL SIGNAL could be shorted to a high voltage or shorted to a low voltage. This fault does not reflect a safety problem with the operation of the IC or of the motor driver, but rather with the signal line between the external clock generator and the motor controller. In this example, continued operation of the motor may be acceptable and even desirable, but the response is programmable on a case-by-case basis based on whether the SPEED CONTROL SIGNAL is stuck high or stuck low using an additional configuration register. If the SPEED CONTROL SIGNAL is stuck high, the registers in OTP 314 can be programmed to either stop the motor or to drive it with a programmable duty cycle of 25%, 50%, 75%, or 100%. If the SPEED CONTROL SIGNAL is stuck low, the registers in OTP 314 can be programmed to either stop the motor or to drive it with a programmable duty cycle of 25%, 50%, 75%, or 100%, independent of the setting for the stuck-high condition.

EXAMPLE 2

Operation with an Upper Control Unit

Example 2 corresponds to a system with an upper control unit such as motor system 200 of FIG. 2. The Examples of actions that could be taken for various fault conditions are illustrated in TABLE VI below:

TABLE VI

UPPER CONTROL UNIT EXAMPLE

| ERROR STATE | PROTECTION OPERATION | DIAG SIGNAL |
| --- | --- | --- |
| OVER VOLTAGE | MOTOR STOP AUTO RECOVERY | OFF |
| OVER TEMPERATURE | SPEED CONTROL SIGNAL | ON |
| OVER CURRENT | MOTOR STOP LATCH | ON |
| INPUT ERROR | CASE-BY-CASE | ON |

The speed of the motor during the normal operation state is again based on the externally-supplied SPEED CONTROL SIGNAL but the response to various fault conditions is determined by MCU 210 for certain selected faults and by the values programmed into OTP 314 for other faults. In response to selected fault conditions, protection logic circuit 320 activates the DIAG signal. In one embodiment, the DIAG signal is provided to an interrupt input of MCU 210. In response to taking the interrupt, MCU 210 reads the MRDIAG0 and MRDIAG1 registers in system registers 316 using SPI interface 312 to determine the source of the error and the actions to be taken in response.

In the case of an over-voltage fault, protection logic circuit 320 activates the DIAG signal. The registers in OTP 314 are programmed to activate the PROTECTION SIGNAL by setting MRCONF10[2] to 0. The over-voltage fault indicates that the motor should be stopped but that motor control circuit 330 should enter an auto-recovery state, and the auto-recovery operation proceeds as described above. In response to the activation of the DIAG signal, MCU 210 determines that the fault was caused by an overvoltage condition, but takes no further action since it is unable to affect the power supply voltage itself. Thus MCU 210 uses motor controller 300 to recover from the overvoltage fault even though it operates as an upper control unit.

In the case of an over-temperature fault, protection logic circuit 320 activates the DIAG signal. The registers in OTP 314 are programmed to are programmed to inactivate the PROTECTION SIGNAL by setting MRCONF10[4] to 1. In response to determining that an over-temperature fault caused the interrupt by seeing that MRDIAG0[6] is set to 1, MCU 210 re-writes an internal PWM duty cycle register to change the duty cycle of the SPEED CONTROL SIGNAL to change the speed of the motor as desired, such as by slowing or raising the speed.

In the case of an over-current fault, protection logic circuit 320 activates the DIAG signal. The registers in OTP 314 are programmed to are programmed to activate the PROTECTION SIGNAL by setting MRCONF10[1] to 0 and to latch the motor off by setting MRCONF11[1] to 1. The over-current condition is very dangerous but if MCU 210 can determine the source of the error and take appropriate corrective action, then it can simply reset the motor and restart operation. Otherwise, it may indicate a permanent stopped state.

In the case of a control input error, protection logic circuit 320 activates the DIAG signal. Protection logic circuit 320 can either stop the motor or continue operation at a preselected duty cycle in the manner described above, in which the preselected duty cycle can vary based on whether the line is stuck high (100% duty cycle) or stuck low (0% duty cycle). Independently MCU 210 can determine the error and take corrective action. For example, it may determine that an error in the instruction stream erroneously caused its PWM to output a continuous logic high or a continuous logic low. If MCU 210 determines that this state was likely due to a random software error, then it can restart the motor by correcting its PWM registers. Regardless of the action taken by MCU 210, however, outputting the DIAG signal provides more flexible operation by allowing MCU 210 to take a variety of corrective actions.

Figure 4:
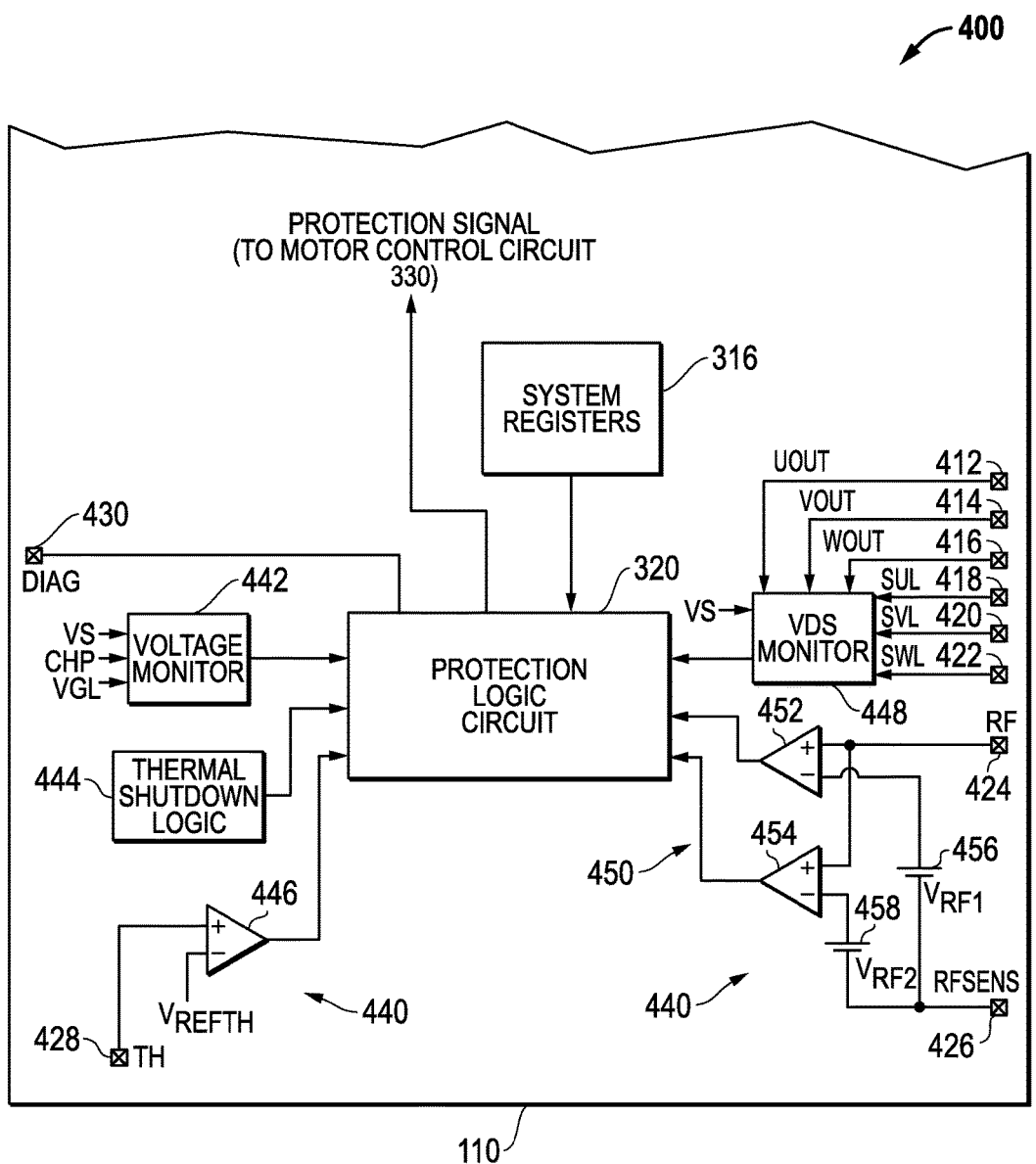
FIG. 4 illustrates in partial block diagram and partial schematic form an example of an IC motor controller that can be used to implement motor controller 300 of FIG. 3.

FIG. 4 illustrates in partial block diagram and partial schematic form an example of an IC motor controller 400 that can be used to implement motor controller 300 of FIG. 3. IC motor controller 400 includes system registers 316 and protection logic circuit 320 as previously described, but also a set of bonding pads 410 and a fault detection circuit 440. Bonding pads 410 include a set of bonding pads listed in TABLE IV below:

TABLE IV

| PAD NO. | NAME | DESCRIPTION |
| --- | --- | --- |
| 412 | UOUT | Current return path for high-side gate drive for the U phase and reference for short circuit shut-off |
| 414 | VOUT | Current return path for high-side gate drive for the W phase and reference for short circuit shut-off |
| 416 | WOUT | Current return path for high-side gate drive for the W phase and reference for short circuit shut-off |
| 418 | SUL | Current return path for low-side gate drive for the U phase; short circuit shutoff level is measured between this pin and its corresponding phase pin |
| 420 | SVL | Current return path for low-side gate drive for the V phase; short circuit shutoff level is measured between this pin and its corresponding phase pin |
| 422 | SWL | Current return path for low-side gate drive for the W phase; short circuit shutoff level is measured between this pin and its corresponding phase pin |
| 424 | RF | Output current detect pin, for connection to the output side of a shunt resistor with Kelvin leads |
| 426 | RFSENS | Output current detect pin, for connection to the ground side of a shunt resistor with Kelvin leads |
| 428 | TH | Thermistor input pin for FET temperature detection |
| 430 | DIAG | Diagnostic output signal with programmable open-drain output |

Fault detection circuit 440 includes a voltage monitor 442, a thermal shutdown logic circuit 444, a comparator 446, a drain-to-source voltage (VDS) monitor 448, and a current sense circuit 450. Voltage monitor 442 has a first input for receiving a voltage labeled "VS", a second input for receiving a voltage labeled "CHP", a third input for receiving a voltage labeled "VGL", and an output for providing a voltage fault signal. Voltage monitor 442 provides its fault signal when any one of these voltages is out of range, either under voltage or over voltage. VS is provided from a power supply pin that is used to power the on-chip circuits. CHP is a power supply pin for the high-side power MOSFET gate drive. VGL is the power supply pin for the low-side power MOSFET gate drive.

Thermal shutdown logic circuit 444 is an on-chip temperature monitor that estimates junction temperature to protect against over-temperature damage. In response to exceeding a first temperature threshold, it provides a thermal warning indication that allows an upper control unit to take corrective action. In response to exceeding a second, higher temperature threshold, it provides a thermal protection fault signal to indicate an over-temperature condition that causes a thermal shutdown.

Comparator 446 has a non-inverting input connected to bonding pad 428, an inverting input for receiving a reference voltage labeled "$V_{REFTH}$", and output for providing a fault signal indicating an external temperature fault, measured by a thermistor.

VDS monitor 448 has inputs connected to bonding pads 412-422, an input for receiving voltage VS, and an output for providing a FET short circuit fault signal. VDS monitor 448 measures the drain-to-source voltage of each transistor in motor driver 120 and provides the FET short circuit fault signal when any drain-to-source voltage is below a threshold. Voltage VS is the drain voltage for all three of the high-side drive transistors and UOUT, VOUT, and WOUT are the source voltages for the high-side drive transistors for the U, V, and W phases, respectively. UOUT, VOUT, and WOUT are also the respective drain voltages for the low-side drive transistors for the U, V, and W phases, and SUL, SVL, and SWL are the source voltages for the low-side drive transistors for the U, V, and W phases, respectively.

Current sense circuit 450 includes comparators 452 and 454 and voltage sources 456 and 458. Comparator 452 has a non-inverting input connected to bonding pad 424, an inverting input, and output for providing a first over-current signal. Comparator 454 has a non-inverting input connected to bonding pad 424, an inverting input, and output for providing a second over-current signal. Voltage source 456 has a positive terminal connected to the inverting input of comparator 452, and a negative terminal connected to bonding pad 426, and provides a voltage labeled "$V_{RF1}$" relative to RFSENS. Voltage source 458 has a positive terminal connected to the inverting input of comparator 454, and a negative terminal connected to bonding pad 426, and provides a voltage labeled "$V_{RF2}$" relative to RFSENS. In this embodiment, $V_{RF2}$ is higher than $V_{RF1}$. Protection logic circuit 320 uses the first over-current signal to detect a limit for the present PWM period. If the voltage between RF and RFSENS exceeds $V_{RF1}$, then the active power MOSFESTs are shut off until the next PWM period. If the voltage between RF and RFSENS exceeds $V_{RF2}$, comparator 454 activates the second current limit signal as a fault signal to protection logic circuit 320, and if MRCONF11[1] is 0, motor controller 110 goes into over-current shutoff by driving a low voltage on all gate drivers to put the power MOSFETs in a high impedance state.

It should be apparent that fault detection circuit 440 may detect other types of faults, and the ones implemented by IC motor controller 400 are merely illustrative. Moreover, the response to various types of faults may vary between different motor controllers. For example IC motor controller 400 is especially adapted for the automotive environment, in which certain types of faults are presumed to be serious such that immediate action will taken, whereas other types of faults are tolerable.

Thus a motor controller as described herein includes a variety of protection modes to allow it to be used in various applications, especially in the automotive environment. It includes generally a mode select circuit, a protection logic circuit, and a motor control circuit. The mode select circuit provides a mode signal to indicate either an internal protection mode or an external protection mode, and in one form may be implemented using one-time programmable memory that establishes the modes and allows the motor controller to more easily be used in stand-alone applications. The protection logic circuit detects whether the motor system is operating normally or is in a fault state. If the motor system is operating in the fault state, the protection logic circuit outputs a protection signal in the internal protection mode and outputs an external diagnostic signal while keeping the protection signal inactive in the external protection mode. The motor control circuit controls a motor, such as a 3-phase BLDC motor, in response to a speed control signal when the protection signal is inactive, and to the protection signal itself in response to an activation of the protection signal.

The above-disclosed subject matter is to be considered illustrative, and not restrictive, and the appended claims are intended to cover all such modifications, enhancements, and other embodiments that fall within the true scope of the claims. For example in various embodiments, the motor controller can recognize various types of faults that are specific to its environment. For example in the automotive environment, over-current, under-voltage, over-voltage, motor driver short circuit, over-temperature, locked rotor, and control input errors may be important. Moreover the mode select circuit may also include various interfaces to allow on-chip OTP memory to be programmed easily. The on-chip OTP may be implemented using a variety of techniques, including fuses, anti-fuses, and floating-gate memory.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A motor controller for use in a motor system, comprising:
   a mode select circuit for setting the motor controller in one of an internal protection mode and an external protection mode;
   a fault detection circuit for detecting whether the motor system is operating in a normal operation state or a fault state;
   a protection logic circuit coupled to said mode select circuit and said fault detection circuit, wherein if the motor system is operating in said fault state, said protection logic circuit outputs a protection signal in said internal protection mode, and keeps said protection signal inactive while activating an external diagnostic signal in said external protection mode; and
   a motor control circuit for controlling a motor of the motor system in response to a speed control signal when said protection signal is inactive, and in response to said protection signal when said protection signal is active.

2. The motor controller of claim 1 wherein said fault state comprises a plurality of fault conditions, and said fault detection circuit provides a plurality of fault detection signals each corresponding to one of said plurality of fault conditions.

3. The motor controller of claim 2 wherein said mode select circuit comprises at least one system register for setting said one of said internal protection mode and said external protection mode independently for each of said plurality fault conditions.

4. The motor controller of claim 2 wherein said mode select circuit comprises a system register having a bit for setting the motor controller into said one of said internal protection mode and said external protection mode for all of said plurality fault conditions.

5. The motor controller of claim 1 wherein said mode select circuit comprises:
   a one time programmable (OTP) memory for storing an initial value of a mode signal, wherein said mode signal indicates said internal protection mode or said external protection mode; and
   a system register for loading said initial value of said mode signal in response to a reset operation, and thereafter providing an output thereof to said protection logic circuit.

6. The motor controller of claim 5 wherein said mode select circuit further comprises:
   a serial interface circuit having an input for receiving external data, and an output coupled to said OTP memory and to said system register for providing said external data for programming said OTP memory and said system register.

7. The motor controller of claim 6 wherein said serial interface circuit is a serial peripheral interface (SPI) slave.

8. The motor controller of claim 1 wherein said mode select circuit further includes at least one bit for specifying an action to be taken in response to said fault state, and said protection signal includes said at least one bit.

9. The motor controller of claim 8 wherein said at least one bit selects one of a self-recovery state and a latched off state.

10. The motor controller of claim 1 wherein:
    said mode select circuit, said protection logic circuit, and said motor control circuit are combined on a single monolithic integrated circuit.

11. A motor system comprising:
    a motor controller having a normal operation state and a fault state, wherein:
      in said normal operation state, said motor controller provides a plurality of gate driver signals in response to a speed control signal and at least one feedback signal, and
      in said fault state, said motor controller operates in a selected one of an internal protection mode and an external protection mode, wherein in said internal protection mode said motor controller takes a predetermined action, and in said external protection mode said motor controller activates a diagnostic signal without taking said predetermined action.

12. The motor system of claim 11 further comprising:
a motor driver responsive to said plurality of gate driver signals for providing a plurality of motor phase drive signals in response to said plurality of gate driver signals, and for providing said at least one feedback signal; and
a motor for rotating in response to said plurality of gate driver signals.

13. The motor system of claim 11 wherein said predetermined action comprises a selected one of an auto recovery operation and a latch off operation.

14. The motor system of claim 11 wherein said motor controller comprises:
a mode select circuit for setting said motor controller in one of said internal protection mode and said external protection mode;
a fault detection circuit for detecting whether the motor system is operating in said normal operation state or said fault state;
a protection logic circuit coupled to said mode select circuit and said fault detection circuit, wherein if the motor system is operating in said fault state, said protection logic circuit outputs a protection signal in said internal protection mode, and keeps said protection signal inactive while activating an external diagnostic signal in said external protection mode; and
a motor control circuit for controlling a motor of the motor system in response to a speed control signal when said protection signal is inactive, and in response to said protection signal when said protection signal is active.

15. The motor system of claim 14 wherein said fault detection circuit detects that the motor system is in said fault state in response to a plurality of fault conditions.

16. The motor system of claim 15 wherein said mode select circuit comprises at least one system register for setting said one of said internal protection mode and said external protection mode for each of said plurality fault conditions.

17. The motor system of claim 15 wherein said mode select circuit comprises a system register having a bit for setting the motor controller into said one of said internal protection mode and said external protection mode for all of said plurality fault conditions.

18. The motor system of claim 15 wherein said mode select circuit further includes at least one bit for specifying an action to be taken in response to said fault state, wherein said at least one bit selects one of a self-recovery state and a latched off state.

19. The motor system of claim 11 further comprising:
an upper control unit having an input for receiving said diagnostic signal, and an output coupled to said motor controller for providing said speed select signal.

20. A method for use in a motor system comprising:
controlling an operation of a motor in response to at least one control input signal;
detecting a fault condition of the motor system, and in response to detecting the fault condition:
determining whether the motor system is in an internal protection mode or an external protection mode;
taking a predetermined action in said internal protection mode; and
activating a diagnostic signal without taking said predetermined action in said external protection mode.

21. The method of claim 20 wherein said taking said predetermined action in said internal protection mode comprises:
determining whether the motor system is in a latched mode;
performing an auto recovery operation if the motor system is not in said latched mode; and
latching off the motor system if the motor system is in said latched mode.

22. The method of claim 20 wherein said detecting a fault condition of the motor system comprises detecting a plurality of fault conditions.

23. The method of claim 22 wherein said determining whether the motor system is in said internal protection mode or said external protection mode comprises determining whether the motor system is in a corresponding internal protection mode or a corresponding external protection mode for each of said plurality of fault conditions.

24. The method of claim 22 wherein said determining whether the motor system is in said internal protection mode or said external protection mode comprises determining whether the motor system is in said internal protection mode or said external protection mode for all of said plurality of fault conditions.

* * * * *